(12) United States Patent
Shioya et al.

(10) Patent No.: US 11,447,183 B2
(45) Date of Patent: Sep. 20, 2022

(54) VEHICLE STRUCTURE OF FRAME VEHICLE

(71) Applicant: TOYOTA JIDOSHA KABUSHIKI KAISHA, Toyota (JP)

(72) Inventors: Ryosuke Shioya, Toyota (JP); Kazunori Ogawa, Toyota (JP); Yoshimi Toda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 16/850,595

(22) Filed: Apr. 16, 2020

(65) Prior Publication Data

US 2020/0406976 A1 Dec. 31, 2020

(30) Foreign Application Priority Data

Jun. 25, 2019 (JP) .............................. JP2019-117479

(51) Int. Cl.
*B62D 21/09* (2006.01)
*B62D 21/03* (2006.01)
*B62D 21/11* (2006.01)

(52) U.S. Cl.
CPC ............. *B62D 21/09* (2013.01); *B62D 21/03* (2013.01); *B62D 21/11* (2013.01)

(58) Field of Classification Search
CPC ......... B62D 21/09; B62D 21/03; B62D 21/11
See application file for complete search history.

(56) References Cited

U.S. PATENT DOCUMENTS

| 11,121,427 B1* | 9/2021 | Bustamante Laparra ................... H01M 50/249 |
| 2013/0119706 A1 | 5/2013 | Katayama et al. |
| 2013/0206496 A1 | 8/2013 | Hashimoto |
| 2013/0300096 A1 | 11/2013 | Huston et al. |
| 2017/0001667 A1* | 1/2017 | Ashraf ...................... B60K 1/00 |
| 2017/0120951 A1* | 5/2017 | Ashraf ................. B62D 27/023 |
| 2017/0305248 A1 | 10/2017 | Hara et al. |
| 2019/0148690 A1* | 5/2019 | Newman ................... B60K 1/04 429/99 |

FOREIGN PATENT DOCUMENTS

| CN | 104736418 A | 6/2015 |
| CN | 205632662 U | 10/2016 |
| CN | 107444093 A | 12/2017 |

(Continued)

*Primary Examiner* — Lori L Lyjak
(74) *Attorney, Agent, or Firm* — Sughrue Mion, PLLC

(57) ABSTRACT

A vehicle structure of a frame vehicle includes a central frame portion, a front-side frame portion, and a rear-side frame portion as a frame. A first section of the front-side frame portion from a connecting portion (a rear end portion) to a central frame portion through a portion supporting a front suspension, and a second section of the rear-side frame portion from a connecting portion (a front end portion) to the central frame portion through a portion supporting a rear suspension are formed so as to be symmetrical to each other in the front-rear direction with respect to the central frame portion. The front and rear suspensions are attached to the front-side and rear-side frame portions, respectively, so that the front and rear suspensions are symmetrical to each other in the front-rear direction with respect to the central frame portion.

4 Claims, 9 Drawing Sheets

(56) References Cited

FOREIGN PATENT DOCUMENTS

| | | | |
|---|---|---|---|
| CN | 107585211 A | | 1/2018 |
| CN | 209037662 U | * | 6/2019 |
| CN | 210338042 U | * | 4/2020 |
| CN | 212220377 U | * | 12/2020 |
| JP | 50-52632 U | | 5/1975 |
| JP | 51-36813 U | | 3/1976 |
| JP | 6-18156 U | | 3/1994 |
| JP | 6-115357 A | | 4/1994 |
| JP | 2009-227216 A | | 10/2009 |
| JP | 2011-111141 A | | 6/2011 |
| JP | 2013-105615 A | | 5/2013 |
| JP | 2014-015166 | | 1/2014 |
| JP | 2017-193287 A | | 10/2017 |
| KR | 20200063396 A | * | 6/2020 |
| WO | 2013/142223 A1 | | 9/2013 |

* cited by examiner

VEHICLE STRUCTURE OF FRAME VEHICLE

INCORPORATION BY REFERENCE

The disclosure of Japanese Patent Application No. 2019-117479 filed on Jun. 25, 2019 including the specification, drawings and abstract is incorporated herein by reference in its entirety.

BACKGROUND

1. Technical Field

The disclosure relates to a vehicle structure of a frame vehicle.

2. Description of Related Art

A so-called frame vehicle has been known in which a body (a cabin) is mounted on a frame through a cab mount and so on, unlike a so-called monocoque vehicle in which a frame and a body are integrated with each other.

For example, in a front engine-front drive vehicle, a front tire-wheel assembly plays not only a role of transmitting driving force generated by an engine to a grounding surface, but also a role of steering. In other words, the front tire-wheel assembly carries out both driving and steering. Therefore, the thought that a rear tire-wheel assembly only needs to roll (be supported) is predominant. Therefore, regardless of the monocoque vehicle or the frame vehicle, it is common that a front suspension and a rear suspension have different structures from each other.

For example, Japanese Unexamined Patent Application Publication No. 2009-227216 (JP 2009-227216 A) discloses a frame vehicle. Although the frame vehicle is a front engine-rear drive vehicle, a double wishbone type is used for a front suspension while a rear suspension includes a rigid axle, a leaf spring, a shock absorber, and so on.

In the frame vehicle described in JP 2009-227216 A, a main frame is made of a single member that extends form a front end of the vehicle through a rear end of the vehicle. However, since the front suspension and the rear suspension are different from each other, a front portion of the main frame for supporting the front suspension, and a rear portion of the main frame for supporting the rear suspension have shapes that are greatly different from each other.

SUMMARY

Other than the frame vehicle described in JP 2009-227216 A above in which the frame is made of the single main frame, there is known a frame vehicle in which a frame includes a central frame portion and front-side and rear-side frame portions, and front and rear suspensions are supported by the front-side and rear-side frame portions, respectively. The central frame is provided in a center portion in the vehicle front-rear direction, and the front-side and rear-side frame portions are connected to a front end portion and a rear end portion of the central frame portion, respectively.

However, in the frame vehicle including the central frame portion, and the front-side and rear-side frame portions, when the front suspension and the rear suspension are different from each other, shapes and so on of the front-side frame portion and the rear-side frame portion that support the front suspension and the rear suspension, respectively, are also different from each other. Therefore, a problem arises that the number of components increases. Also because a connecting structure between the central frame portion and the front-side frame portion, and a connecting structure between the central frame portion and the rear-side frame portion are different from each other, and a mounting structure for the front suspension and a mounting structure for the rear suspension are different from each other, a problem arises that manufacturing and assembly cost increases.

The disclosure has been accomplished in light of these problems, and an object of the disclosure is to realize a vehicle structure that is able to suppress an increase in the number of components and an increase in manufacturing and assembly cost for a frame vehicle.

In order to achieve the above object, in a vehicle structure of a frame vehicle according to the disclosure, front and rear suspensions, and portions of front-side and rear-side frame portions that support the suspensions, respectively, are provided so as to be symmetrical in the front-rear direction with respect to a central frame portion.

Specifically, the disclosure is applied to a vehicle structure of a frame vehicle in which a body is mounted on a frame through a mount.

The vehicle structure of the frame vehicle includes a central frame portion, a front-side frame portion, and a rear-side frame portion as the frame. The central frame portion is provided in a center portion of the vehicle structure in a vehicle front-rear direction and formed so as to be symmetrical in the front-rear direction. The front-side frame portion is connected to a front end portion of the central frame portion and supports a front suspension. The rear-side frame portion is connected to a rear end portion of the central frame portion and supports a rear suspension. At least a section of the front-side frame portion from a connecting portion of the front-side frame portion to the central frame portion through a portion supporting the front suspension, and a section of the rear-side frame portion from a connecting portion of the rear-side frame portion to the central frame portion through a portion supporting the rear suspension are formed so as to be symmetrical to each other in the front-rear direction with respect to the central frame portion. The front suspension and the rear suspension have the same shape and are attached to the front-side frame portion and the rear-side frame portion, respectively, so as to be symmetrical to each other in the front-rear direction with respect to the central frame portion.

With this configuration, the front suspension and the rear suspension have the same shape. In addition, the portion of the front-side frame portion for supporting the suspension, and the portion of the rear-side frame portion for supporting the suspension are symmetrical to each other in the front-rear direction with respect to the central frame portion. Therefore, the components are communized, and it is thus possible to suppress an increase in the number of components. Further, a mounting structure for the front suspension and a mounting structure for the rear suspension may be the same structure. As a result, it is also possible to suppress an increase in manufacturing and assembly cost.

Also, since the central frame portion is formed so as to be symmetrical in the front-rear direction, and the connecting portion of the front-side frame portion to the central frame portion and the connecting portion of the rear-side frame portion to the central frame portion are symmetrical to each other in the front-rear direction with respect to the central frame portion. Therefore, a connecting structure of the front-side frame portion to the central frame portion, and a connecting structure of the rear-side frame portion to the central frame portion may be the same structure, and it is thus possible to further suppress an increase in manufacturing and assembly cost.

In addition, with the disclosure, as long as at least the section of the front-side frame portion from the connecting portion of the front-side frame portion to the central frame portion through the portion supporting the front suspension (hereinafter, also referred to as a first section), and the section of the rear-side frame portion from the connecting portion of the rear-side frame portion to the central frame portion through the portion supporting the rear suspension (hereinafter, also referred to as a second section) are formed so as to be symmetrical to each other in the front-rear direction, the front-side frame portion and the rear-side frame portion do not need to be symmetrical to each other in the front-rear direction (the same shape). Therefore, for example, the front-side frame portion and the rear-side frame portion are formed into the same shape. At the same time, a portion of the front-side frame portion in front of the first section, or a portion of the rear-side frame portion behind the second section may be cut. Thus, it is possible to easily realize a frame vehicle having the front-side frame portion and the rear-side frame portion with different lengths from each other. As a result, it is possible to increase a degree of freedom in a layout of a vehicle while communization of components is achieved.

Further, the central frame portion is symmetrical in the front-rear direction, the first section and the second section are symmetrical to each other in the front-rear direction with respect to the central frame portion, and the front suspension and the rear suspension are symmetrical to each other in the front-rear direction with respect to the central frame portion. Therefore, for example, it is possible to realize a frame vehicle that is able to travel forward and backward in the same mode regardless of the frontward and rearward directions.

Also, in the vehicle structure of the frame vehicle, the central frame portion may include a pair of side rails and support a battery. The side rails extend in the vehicle front-rear direction in both end portions of the central frame portion in a vehicle width direction, respectively. Also, lower ends of the side rails are set at positions lower than on-board components including the battery and both of the front suspension and the rear suspension.

With this configuration, the lower ends of the side rails having relatively high rigidity in a vehicle body member are set at positions lower than the on-board components such as the battery, the suspensions, and, for example, an electric motor. Thus, it is possible to protect the on-board components from an obstacle and the like on a road surface.

When a battery panel that configures a bottom surface of the battery is attached to the vehicle body member from below, it is necessary to have a given interval between the vehicle body member and the battery in order to avoid interference between the vehicle body member and the battery. Therefore, for example, when brackets (not shown) projecting inward from the side rails, respectively, with respect to the vehicle are provided, and the battery panel is attached to the brackets, it is necessary to provide given intervals between the brackets and the battery, respectively, in order to avoid interference between the brackets and the battery. Therefore, there is a problem that a space for installing the battery is restricted as much as projection of the brackets.

Therefore, it is considered that the battery panel is directly attached to the lower ends of the side rails without the brackets. However, this may cause a problem that the battery panel is positioned lower than the lower ends of the side rails, and it may make it more difficult to protect the battery from an obstacle or the like on a road surface.

Therefore, in the vehicle structure of the frame vehicle, the battery may be supported as a battery panel that configures a bottom surface of the battery is stretched between the side rails in the vehicle width direction, and inside portions of lower surfaces of the side rails in the vehicle width direction may be formed so as to be one-step higher than outside portions of the lower surfaces of the side rails in the vehicle width direction through step portions, respectively. Also, the battery panel may be attached to the inside portions of the lower surfaces of the side rails in the vehicle width direction from below so that the battery panel is higher than the outside portions of the lower surfaces of the side rails in the vehicle width direction.

With this configuration, since the brackets and so on are not provided, and the battery panel is attached to the inside portions of the lower surfaces of the side rails in the vehicle width direction, it is possible to avoid interference between the frame and the battery as long as the given interval is provided between the frame and the battery. Therefore, it is possible to suppress restriction of an installation space for the battery.

Moreover, the battery panel that configures the bottom surface of the battery is attached from below to the inside portions of the lower surfaces of the side rails in the vehicle width direction so that the battery panel is higher than the outside portions of the lower surfaces of the side rails in the vehicle width direction. Therefore, it is possible to maintain the lower ends of the side rails (the outside portions in the vehicle width direction) at positions lower than the battery panel. Thus, even when the battery panel is attached to the lower surfaces of the side rails, it is possible to protect the battery from an obstacle and the like on a road surface.

In the vehicle structure of the frame vehicle, the central frame portion may include a pair of side rails. The side rails extend in the vehicle front-rear direction in both end portions of the central frame portion in the vehicle width direction, respectively. Meanwhile, the front-side frame portion and the rear-side frame portion may include a pair of front side rails and a pair of rear side rails, respectively. The front side rails and the rear side rails extend in the vehicle front-rear direction at positions higher than the side rails, respectively, and on the inner sides with respect to the side rails in the vehicle width direction, respectively. The vehicle structure may include front-side joint members and rear-side joint members. The front-side joint members are connected to rear end portions of the front side rails, respectively, extend from the rear end portions of the front side rails, respectively, to the rear side in the vehicle front-rear direction so as to be inclined outward in the vehicle width direction and downward, and then are connected to front end portions of the side rails, respectively. The front-side joint members are formed separately from the central frame portion and the front-side and rear-side frame portions. The rear-side joint members are connected to front end portions of the rear side rails, respectively, extend from the front end portions of the rear side rails, respectively, to the front side in the vehicle front-rear direction so as to be inclined outward in the vehicle width direction and downward, and then are connected to rear end portions of the side rails, respectively. The rear-side joint members are formed separately from the central frame portion and the front-side and rear-side frame portions. The front-side joint member and the rear-side joint member may be formed so as to have the same shape.

With this configuration, the rear end portions of the front side rails and the front end portions of the side rails that are located at different positions in the vehicle width direction at different heights from each other are connected to each other through the front-side joint members, respectively, the front-side joint members extending obliquely. Thus, an impact load input to the front-side frame portion is transmitted smoothly to the side rails through the front side rails and the front-side joint members. As a result, it is possible to ensure strength reliability performance and collision performance at the time of a front collision and the like.

Similarly, the front end portions of the rear side rails and the rear end portions of the side rails that are located at different positions in the vehicle width direction at different heights from each other are connected to each other through the rear-side joint members, respectively, the rear-side joint members extending obliquely. Thus, an impact load input to the rear-side frame portion is smoothly transmitted to the side rails through the rear side rails and the rear-side joint members, and it is thus possible to ensure strength reliability performance and collision performance at the time of a rear collision and the like.

Further, as described above, since the central frame portion is symmetrical in the front-rear direction, and the first section and the second section are symmetrical to each other in the front-rear direction with respect to the central frame portion, the front-side joint members and the rear-side joint members that connect the central frame portion to the first section and the second section, respectively, are formed so as to have the same shape. Therefore, it is possible to communize components and connecting structures. Thus, it is possible to further suppress an increase in the number of components and an increase in manufacturing and assembly cost.

Moreover, since the front-side and rear-side joint members are formed separately from the side rails and the front and rear side rails, extension of the entire length of the vehicle can be done flexibly as it is only necessary to extend the side rails without any changes in the front-side and rear-side joint members that are formed separately from the side rails. Further, expansion of the entire width of the vehicle (expansion of the interval between the side rails), lowering of a floor of the vehicle (lowering of the side rails with respect to the front and rear side rails), and so on, are done flexibly because it is only necessary to change lengths, inclined angles, and so on of the front-side and rear-side joint members, the front-side and rear-side joint members being formed separately from the side rails and the front and rear side rails.

Further, with the vehicle structure of the frame vehicle, the central frame portion may include a pair of side rails and front-side and rear-side crossmembers. The side rails extend in the vehicle front-rear direction in both end portions of the central frame portion in the vehicle width direction, respectively. The front-side and rear-side crossmembers extend in the vehicle width direction. The front-side crossmember connects front end portions of the side rails to each other, and the rear-side crossmember connects rear end portions of the side rails to each other. Also, the front-side crossmember may pass through rear end portions of the front-side frame portion in the vehicle width direction, while the rear-side crossmember may pass through front end portions of the rear-side frame portion in the vehicle width direction.

With this configuration, penetrating structures are used. Therefore, it is possible to easily change a relative positional relation among the central frame portion, and the front-side and rear-side frame portions in the vehicle width direction. Therefore, it is possible to easily expand widths of the front-side frame portion and the rear-side frame portion with respect to the common central frame portion, respectively, and it is also possible to easily expand width of the central frame portion with respect to the common front-side and rear-side frame portions.

As described above, with the vehicle structure of the frame vehicle according to the disclosure, it is possible to realize a vehicle structure that is able to suppress an increase in the number of components and an increase in manufacturing and assembly cost.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, embodiments are described with reference to the drawings. In each of the drawings, an arrow Fr represents a front side in the vehicle front-rear direction, an arrow Rh represents a right side in the vehicle width direction, and an arrow Up represents the upward direction.

First Embodiment—Frame

Figure 1:
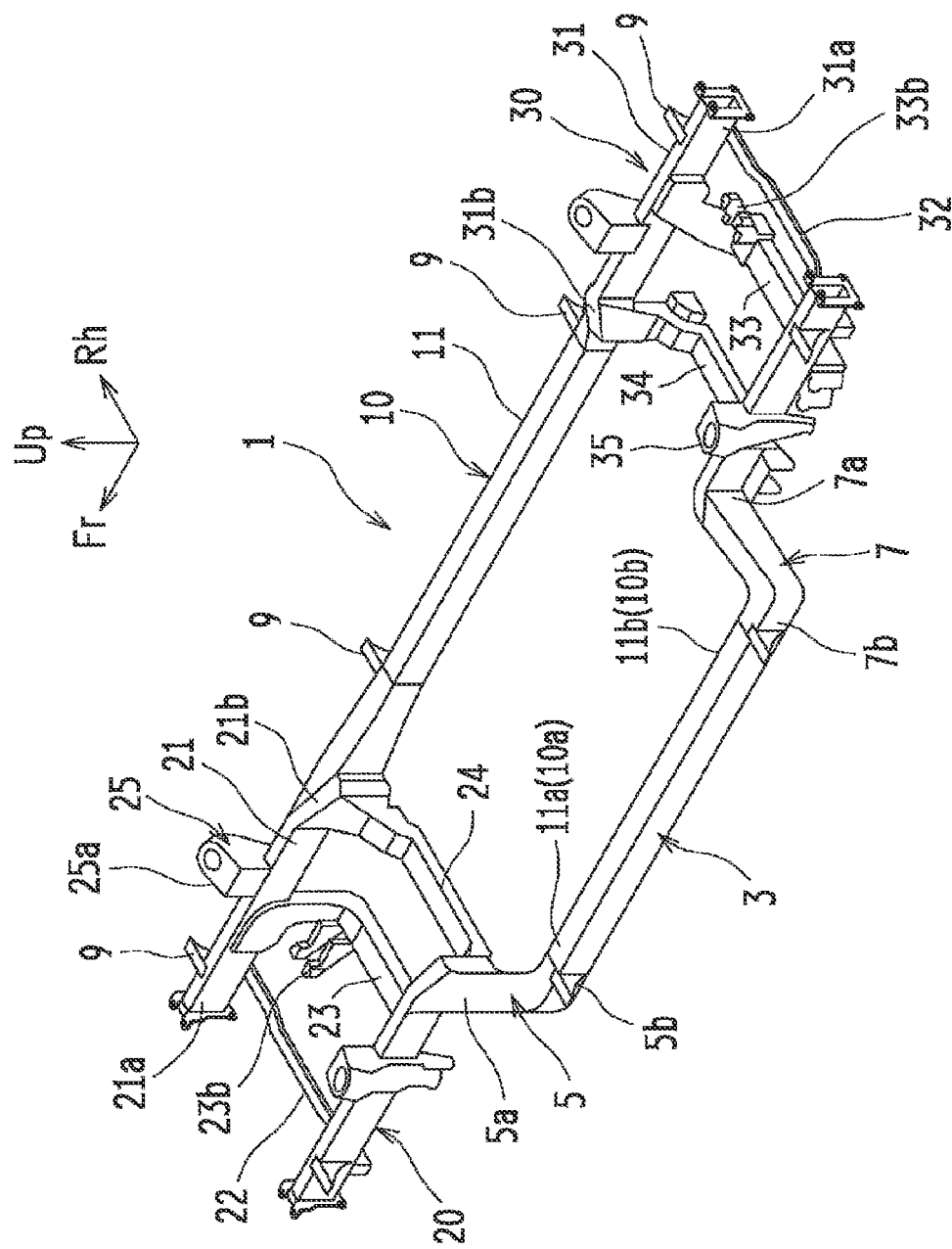
FIG. 1 is a schematic perspective view of a frame of a vehicle provided with a vehicle structure according to a first embodiment.
Figure 2:
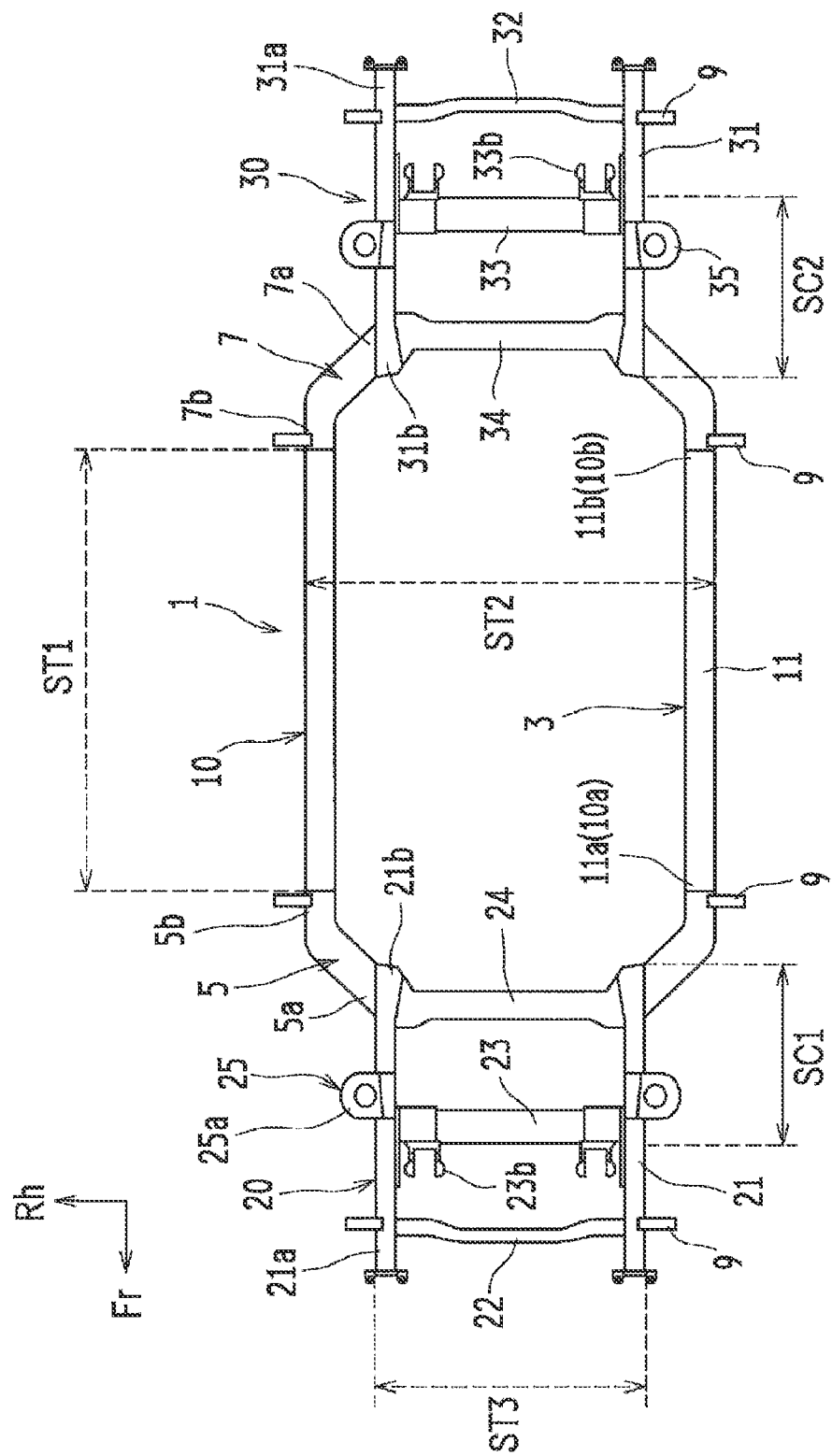
FIG. 2 is a schematic plan view of the frame.
Figure 3:
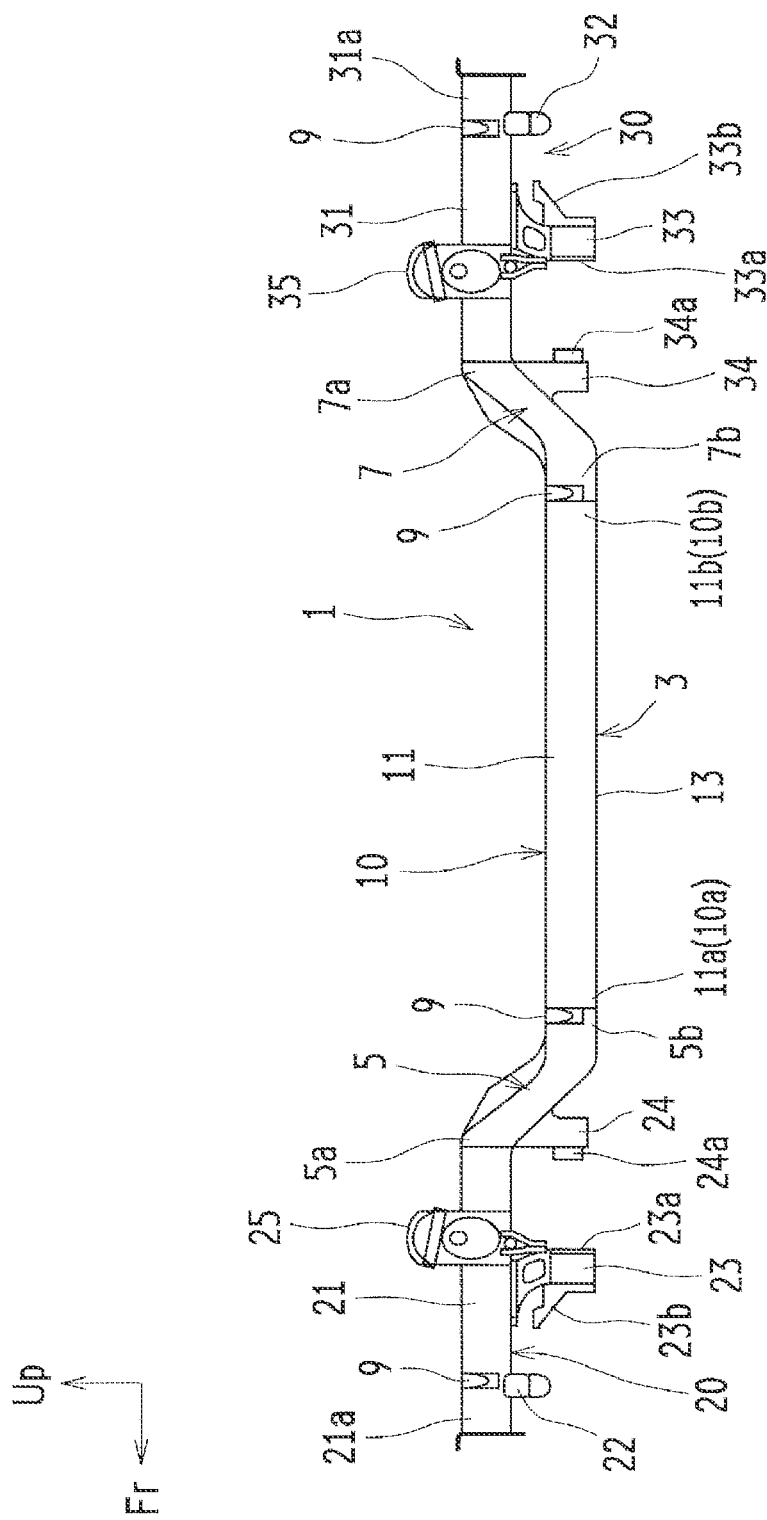
FIG. 3 is a schematic side view of the frame.

FIG. 1 is a schematic perspective view of a frame 3 in a vehicle 1 provided with a vehicle structure according to an embodiment, FIG. 2 is a plan view of the frame 3, and FIG. 3 is a side view of the frame 3. The vehicle 1 is configured as an electric vehicle that is driven by an electric motor 70 (see FIG. 7) in which a battery 60 (see FIG. 7) serves as a main electric power source. The vehicle 1 is also configured as a so-called frame vehicle in which a body (a cabin) (not shown) is mounted on the frame 3 through a cab mount (not shown) that is attached to eight mount attaching portions 9 fixed to the frame 3. Therefore, in the description below, the vehicle 1 is also referred to as the "frame vehicle 1".

As shown in FIG. 1 to FIG. 3, the vehicle structure according to this embodiment includes a central frame portion 10, a front-side frame portion 20, and a rear-side frame portion 30 that serve as the frame 3 and configure a skeleton of the frame vehicle 1. Also, the vehicle structure includes front-side joint members 5 and rear-side joint members 7.

Central Frame Portion

As shown in FIG. 2 and FIG. 3, the central frame portion 10 is provided in a center portion of the vehicle structure in the vehicle front-rear direction. The central frame portion 10 serves as a main frame of the frame 3 and also supports the battery 60 as described later. The central frame portion 10 includes a pair of side rails 11. The side rails 11 extend in the vehicle front-rear direction in both end portions of the central frame portion 10 in the vehicle width direction, respectively, and are formed so as to be symmetrical in the front-rear direction.

Each of the side rails 11 is formed so as to have a closed section with an almost rectangular shape. To be more specific, an inside portion 13b of a lower surface 13 of the side rail 11 in the vehicle width direction is formed so as to be one-step higher than an outside portion 13a of the lower surface 13 of the side rail 11 in the vehicle width direction through a step 13c (see FIG. 8). The side rails 11 are arranged so that lower ends of the side rails 11 (the outside portions 13a in the vehicle width direction) are located at the lowest point of the frame 3, and the lower ends of the side rails 11 are set at positions lower than on-board components that include the battery 60 and suspensions 40, 50 (see FIG. 4 and FIG. 5).

Front-Side Frame Portion

The front-side frame portion 20 is connected to front end portions 10a of the central frame portion 10 through the front-side joint members 5, respectively, and is configured so as to support the front suspensions 40. More specifically, as shown in FIG. 1 to FIG. 3, the front-side frame portion 20 includes a pair of front side rails 21 and first to third front-side crossmembers 22, 23, 24. The front side rails 21 extend in the vehicle front-rear direction in both end portions of the front-side frame portion 20 in the vehicle width direction, respectively. The first to third front-side crossmembers 22, 23, 24 connect the front side rails 21 to each other in the vehicle width direction. In a plan view, the front-side frame portion 20 is formed so as to have a ladder shape.

As shown in FIG. 3, the front side rails 21 extend in the vehicle front-rear direction at positions higher than the side rails 11 of the central frame portion 10, respectively, and also on inner sides with respect to the side rails 11 in the vehicle width direction, respectively, as shown in FIG. 2. Suspension towers 25 to which the front suspensions 40 are attached, respectively, are provided at positions in the front side rails 21 near the second front-side crossmember 23, respectively.

The first front-side crossmember 22 extends in the vehicle width direction, and connects lower end portions of front end portions 21a of the front side rails 21 to each other. Further, the second front-side crossmember 23 extends in the vehicle width direction, and also, both end portions of the second front-side crossmember 23 extend obliquely upward and are attached to inside surfaces of the front side rails 21 facing each other in the vehicle width direction, respectively. Thus, the second front-side crossmember 23 connects center portions of the front side rails 21 to each other. Further, the third front-side crossmember 24 extends in the vehicle width direction, and also, both end portions of the third front-side crossmember 24 extend obliquely upward and are attached to rear end portions 21b of the front side rails 21, respectively. Thus, the third front-side crossmember 24 connects the rear end portions 21b of the front side rails 21 to each other. In both of the second and third front-side crossmembers 23, 24, the both end portions thereof extend obliquely upward, respectively, and are attached to the front side rails 21, respectively. Therefore, as shown in FIG. 3, the second and third front-side crossmembers 23, 24 extend in the vehicle width direction at positions lower than the front side rails 21, respectively.

As shown in FIG. 3, lower arm attaching portions 23a, 24a are provided in the end portions of the second and third front-side crossmembers 23, 24 in the vehicle width direction, respectively, the second and third front-side crossmembers 23, 24 extending in the vehicle width direction at positions lower than the front side rails 21, respectively, as described above. Further, the second front-side crossmember 23 is provided with mount attaching portions 23b to which front-side motor mounts (not shown) for elastically supporting the electric motor 70 are attached, respectively.

The front side rails 21 of the front-side frame portion 20 and the side rails 11 of the central frame portion 10 are connected to each other by the front-side joint members 5, respectively. The front-side joint members 5 are formed separately from the front side rails 21 and the side rails 11. Each of the front-side joint members 5 is formed so as to have a closed section with an almost rectangular shape. Front end portions 5a of the front-side joint members 5 are connected to the rear end portions 21b of the front side rails 21 by welding, respectively. Then, the front-side joint members 5 extend rearward from the rear end portions 21b of the front side rails 21 so as to be inclined outward in the vehicle width direction and downward, respectively, and rear end portions 5b of the front-side joint members 5 extend straight to the rear side, and are connected to front end portions 11a of the side rails 11 by welding, respectively. As described above, the side rails 11 of the central frame portion 10, and the front side rails 21 that are positioned higher than the side rails 11 and also on the inner sides with respect to the side rails 11 in the vehicle width direction, respectively, are connected to each other smoothly by the front-side joint members 5, respectively, in the shortest distance and without bending at an acute angle, the front-side joint members 5 extending rearward so as to be inclined outward in the vehicle width direction and downward.

The front-side frame portion 20 (the front side rails 21) is connected to the front end portions 10a of the central frame portion 10 (the front end portions 11a of the side rails 11) through the front-side joint members 5, respectively. Therefore, in this embodiment, the rear end portions 21b of the front side rails 21 that are connected to the front-side joint members 5, respectively, correspond to a "connecting portion in the front-side frame portion to the central frame portion" in claims.

Rear-Side Frame Portion

The rear-side frame portion 30 is connected to rear end portions 10b of the central frame portion 10 through the rear-side joint members 7, respectively, and is configured so as to support the rear suspensions 50. To be more specific, as shown in FIG. 1 to FIG. 3, the rear-side frame portion 30 includes a pair of rear side rails 31 and first to third rear-side crossmembers 32, 33, 34. The rear side rails 31 extend in the vehicle front-rear direction in both end portions of the rear-side frame portion 30 in the vehicle width direction, respectively. The first to third rear-side crossmembers 32, 33, 34 connect the rear side rails 31 to each other in the vehicle width direction. In a plan view, the rear-side frame portion 30 is formed so as to have a ladder shape.

As shown in FIG. 3, the rear side rails 31 extend in the vehicle front-rear direction at positions higher than the side rails 11 of the central frame portion 10, respectively, and also on the inner sides with respect to the side rails 11 in the vehicle width direction, respectively, as shown in FIG. 2.

Suspension towers 35 to which the rear suspensions 50 are attached, respectively, are provided at positions in the rear side rails 31 near the second rear-side crossmember 33, respectively.

The first rear-side crossmember 32 extends in the vehicle width direction, and connects lower end portions of rear end portions 31a of the rear side rails 31 to each other. Further, the second rear-side crossmember 33 extends in the vehicle width direction, and both end portions of the second rear-side crossmember 33 extend obliquely upward and are attached to inside surfaces of the rear side rails 31 facing each other in the vehicle width direction, respectively. Thus, center portions of the rear side rails 31 are connected to each other by the second rear-side crossmember 33. Further, the third rear-side crossmember 34 extends in the vehicle width direction, and both end portions of the third rear-side crossmember 34 extend obliquely upward and are attached to front end portions 31b of the rear side rails 31, respectively. Thus, the front end portions 31b of the rear side rails 31 are connected to each other by the third rear-side crossmember 34. As described above, in both of the second and third rear-side crossmembers 33, 34, both end portions thereof extend obliquely upward and are attached to the rear side rails 31, respectively. Therefore, as shown in FIG. 3, the second and third rear-side crossmembers 33, 34 extend in the vehicle width direction at positions lower than the rear side rails 31, respectively.

As shown in FIG. 3, lower arm attaching portions 33a, 34a are provided in the end portions of the second and third rear-side crossmembers 33, 34 in the vehicle width direction, respectively, the second and third rear-side crossmembers 33, 34 extending in the vehicle width direction at positions lower than the rear side rails 31, respectively, as described above. Further, mount attaching portions 33b are provided in the second rear-side crossmember 33.

The rear side rails 31 of the rear-side frame portion 30, and the side rails 11 of the central frame portion 10 are connected to each other by the rear-side joint members 7, respectively, the rear-side joint members 7 being formed separately from the rear side rails 31 and the side rails 11. Each of the rear-side joint members 7 is formed so as to have the same shape as that of the front-side joint member 5, and is formed so as to have a closed section with an almost rectangular shape similarly to the front-side joint member 5. Rear end portions 7a of the rear-side joint members 7 are connected to the front end portions 31b of the rear side rails 31, respectively, by welding. After the rear-side joint members 7 extend frontward from the front end portions 31b of the rear side rails 31, respectively, so as to be inclined outward in the vehicle width direction and downward, the front end portions 7b of the rear-side joint members 7 extend straight to the front side, and are connected to rear end portions 11b of the side rails 11, respectively, by welding. As described above, the side rails 11 of the central frame portion 10, and the rear side rails 31 positioned higher than the side rails 11 and also on the inner sides with respect to the side rails 11 in the vehicle width direction, respectively, are connected to each other smoothly by the rear-side joint members 7, respectively, in the shortest distance and without bending at an acute angle, the rear-side joint members 7 extending frontward so as to be inclined outward in the vehicle width direction and downward.

The rear-side frame portion 30 (the rear side rails 31) is connected to the rear end portions 10b of the central frame portion 10 (the rear end portions 11b of the side rails 11) through the rear-side joint members 7, respectively. Therefore, in this embodiment, the front end portions 31b of the rear side rails 31 connected to the rear-side joint members 7, respectively, correspond to a "connecting portion in the rear-side frame portion to the central frame portion" in the claims.

As evident from FIG. 2 and FIG. 3, the front-side frame portion 20 and the rear-side frame portion 30 are formed so as to be symmetrical to each other in the front-rear direction with respect to the central frame portion 10. Further, as described above, the central frame portion 10 is formed so as to be symmetrical in the front-rear direction. Also, the front-side and rear-side joint members 5, 7 that connect the central frame portion 10 and the front-side frame portion 20 to each other, and the central frame portion 10 and the rear-side frame portion 30 to each other, respectively, are also formed so as to have the same shape. Therefore, in the frame vehicle 1 according to this embodiment, the entire frame 3 is formed so as to be symmetrical in the front-rear direction.

Suspension

Figure 4:
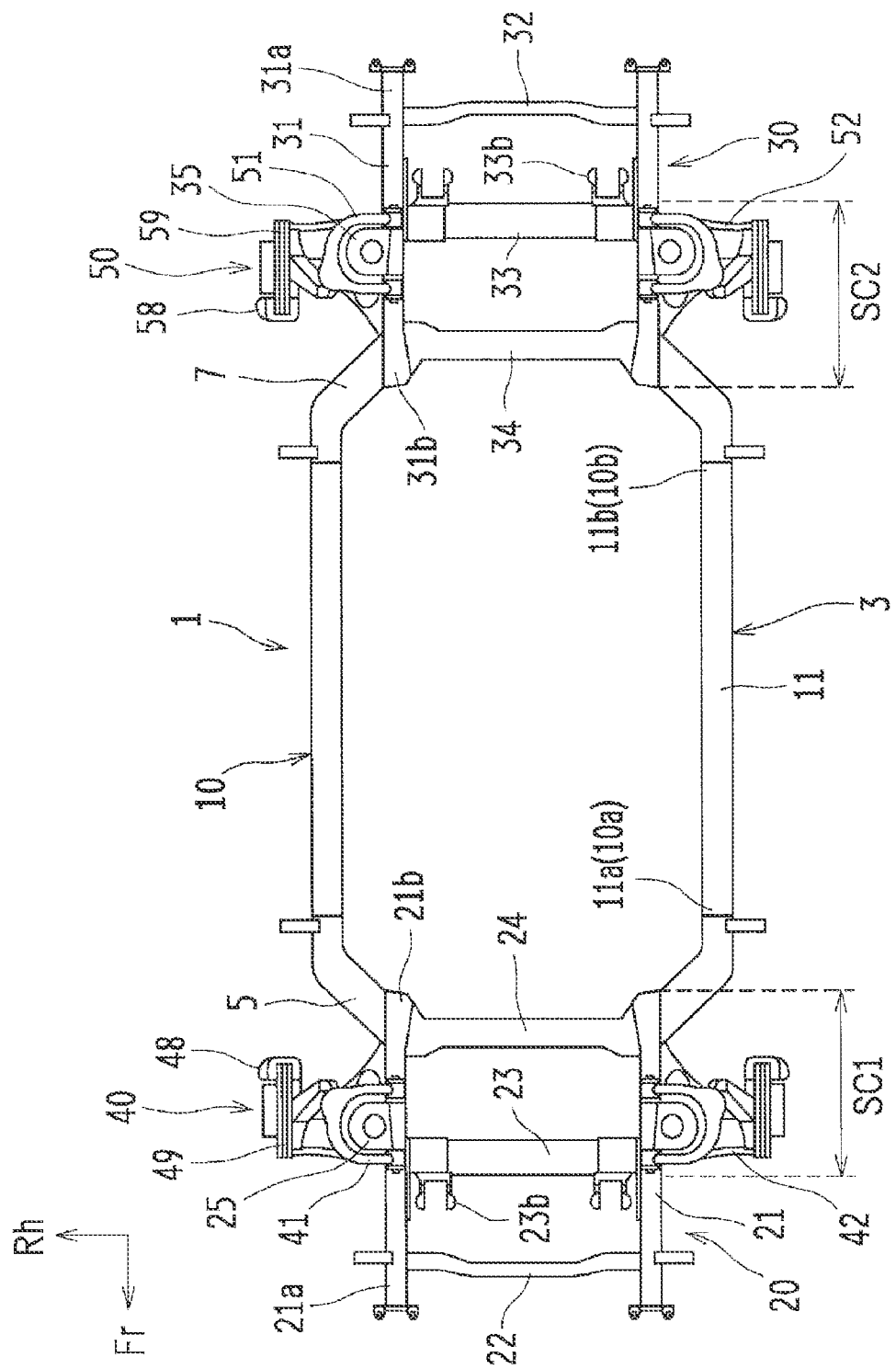
FIG. 4 is a schematic plan view of a state in which suspensions are attached to the frame.
Figure 5:
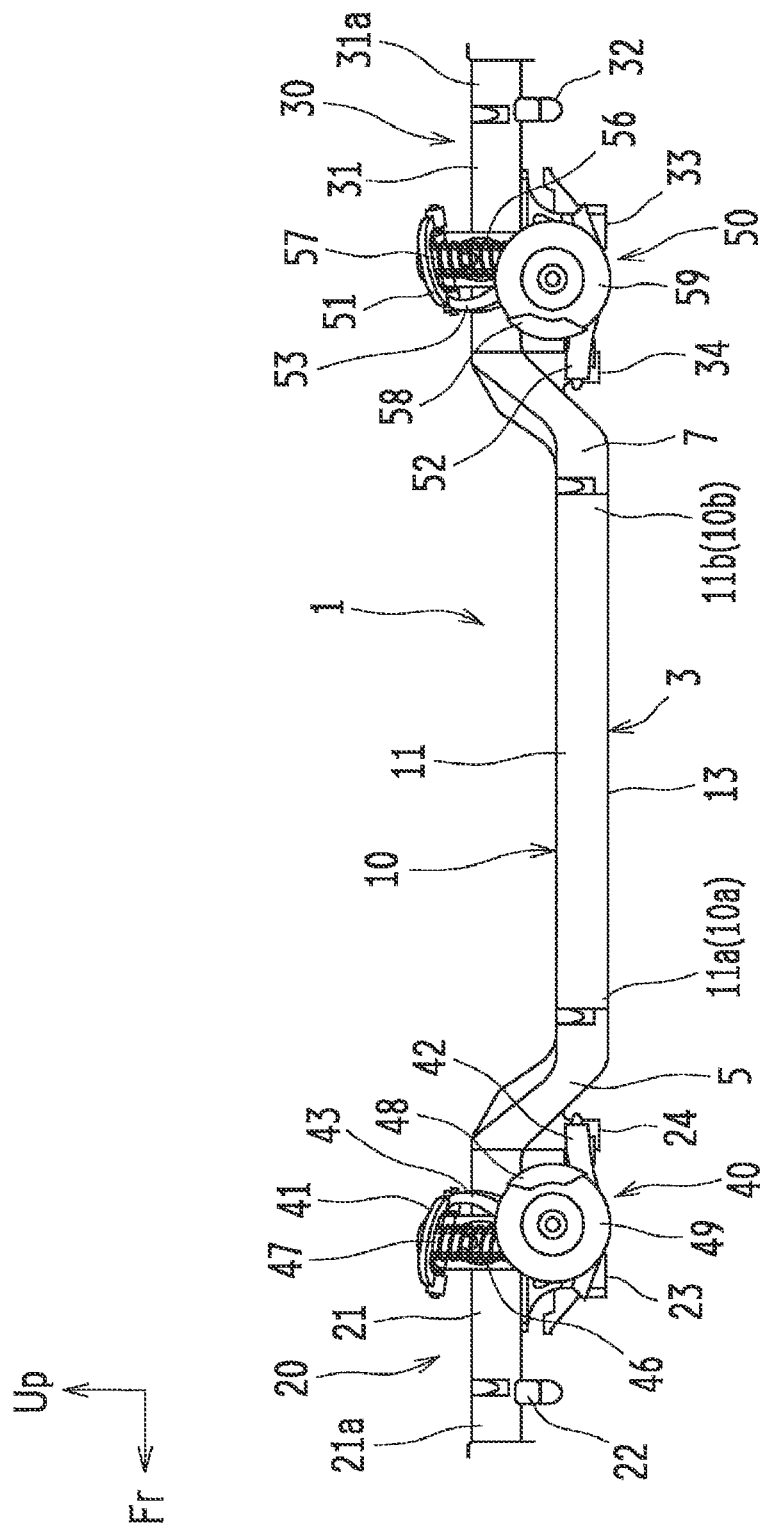
FIG. 5 is a schematic side view of the state in which the suspensions are attached to the frame.
Figure 6:
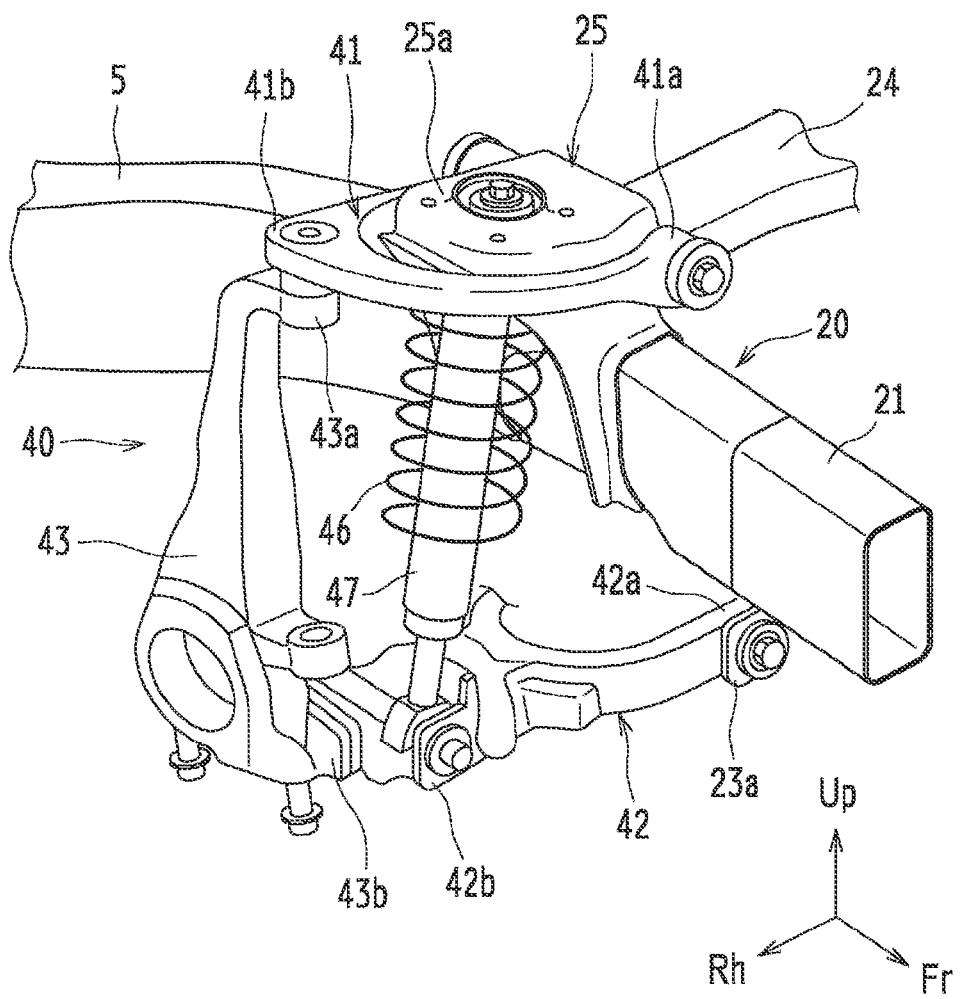
FIG. 6 is a schematic perspective view of the front suspension.

FIG. 4 is a schematic plan view of a state where the suspensions 40, 50 are attached to the frame 3, and FIG. 5 is a side view of the same. Further, FIG. 6 is a schematic perspective view of the front suspension 40. In this embodiment, both the front suspension 40 and the rear suspension 50 are of a double wishbone type in which an upper arm 41 (51) and a lower arm 42 (52) are included, and the front suspension 40 and the rear suspension 50 are formed into the same shape. Therefore, hereinafter, the front suspension 40 is described as a representative. The numbers in the brackets are reference numerals of members of the rear suspension 50 corresponding to the members of the front suspension 40, respectively.

As shown in FIG. 4, the upper arm 41 (51) has a shape that is forked on the inner side in the vehicle width direction. Distal end portions 41a of the forked upper arm 41 (51) are supported by the suspension tower 25 (35) so that the distal end portions 41a are able to rotate around a shaft extending in the vehicle front-rear direction. The lower arm 42 (52) has a shape that is forked on the inner side in the vehicle width direction, and distal end portions 42a of the forked lower arm 42 (52) are supported by the lower arm attaching portions 23a, 24a (only the lower arm attaching portion 23a is shown in FIG. 6) so that the distal end portions 42a are able to rotate around a shaft extending in the vehicle front-rear direction.

As shown in FIG. 4 and FIG. 5, a disk brake 49 (59) and so on are attached to a knuckle 43 (53) through a brake caliper 48 (58) and a wheel hub (not shown). Then, as shown in FIG. 6, a base end portion 41b of the upper arm 41 (51) on the outer side in the vehicle width direction is joined to an upper end portion 43a of the knuckle 43 (53). Meanwhile, a base end portion 42b of the lower arm 42 (52) on the outer side in the vehicle width direction is joined to a lower end portion 43b of the knuckle 43 (53).

A coil spring 46 (56) and a shock absorber 47 (57) are interposed between the suspension tower 25 (35) and the lower arm 42 (52). An upper end portion of the shock absorber 47 (57) is joined to a suspension attaching portion 25a of the suspension tower 25 (35). Further, a lower end portion of the shock absorber 47 (57) is joined to the lower arm 42 (52). As a result, the coil spring 46 (56) absorbs an impact with respect to a push-up load and so on from a road surface, and the shock absorber 47 (57) reduces vibration of the coil spring 46 (56).

With the vehicle structure of the frame vehicle 1 according to this embodiment, the front suspension 40 and the rear suspension 50 are formed so as to have the same shape.

Further, as described above, the front-side frame portion 20 and the rear-side frame portion 30 are formed so as to be symmetrical to each other in the front-rear direction with respect to the central frame portion 10. Therefore, the front suspension 40 and the rear suspension 50 are attached to the front-side frame portion 20 and the rear-side frame portion 30, respectively, so that the front suspension 40 and the rear suspension 50 are symmetrical to each other in the front-rear direction with respect to the central frame portion 10.

In this embodiment, the front-side frame portion 20 and the rear-side frame portion 30 are formed so as to be symmetrical to each other in the front-rear direction with respect to the central frame portion 10. However, as long as the front-side frame portion 20 and the rear-side frame portion 30 can be connected to the central frame portion 10 in the same mode, and the front suspension 40 and the rear suspension 50 are supported so as to be symmetrical to each other in the front-rear direction with respect to the central frame portion 10, it is not necessary that the entire front-side frame portion 20 and the entire rear-side frame portion 30 are formed so as to be symmetrical to each other in the front-rear direction with respect to the central frame portion 10.

Specifically, as shown in FIG. 2 and FIG. 4, it is only necessary that at least a first section SC1 of the front-side frame portion 20 and a second section SC2 of the rear-side frame portion 30 are formed so as to be symmetrical to each other in the front-rear direction with respect to the central frame portion 10. Here, the first section SC1 is a section of the front-side frame portion 20 from a connecting portion to the central frame portion 10 (the rear end portion 21*b* of the front side rail 21) through a portion supporting the front suspension 40 (the suspension tower 25 and the lower arm attaching portions 23*a*, 24*a*). The second section SC2 is a section of the rear-side frame portion 30 from a connecting portion to the central frame portion 10 (the front end portion 31*b* of the rear side rail 31) through a portion supporting the rear suspension 50 (the suspension tower 35 and the lower arm attaching portions 33*a*, 34*a*).

On-Board Components

Figure 7:
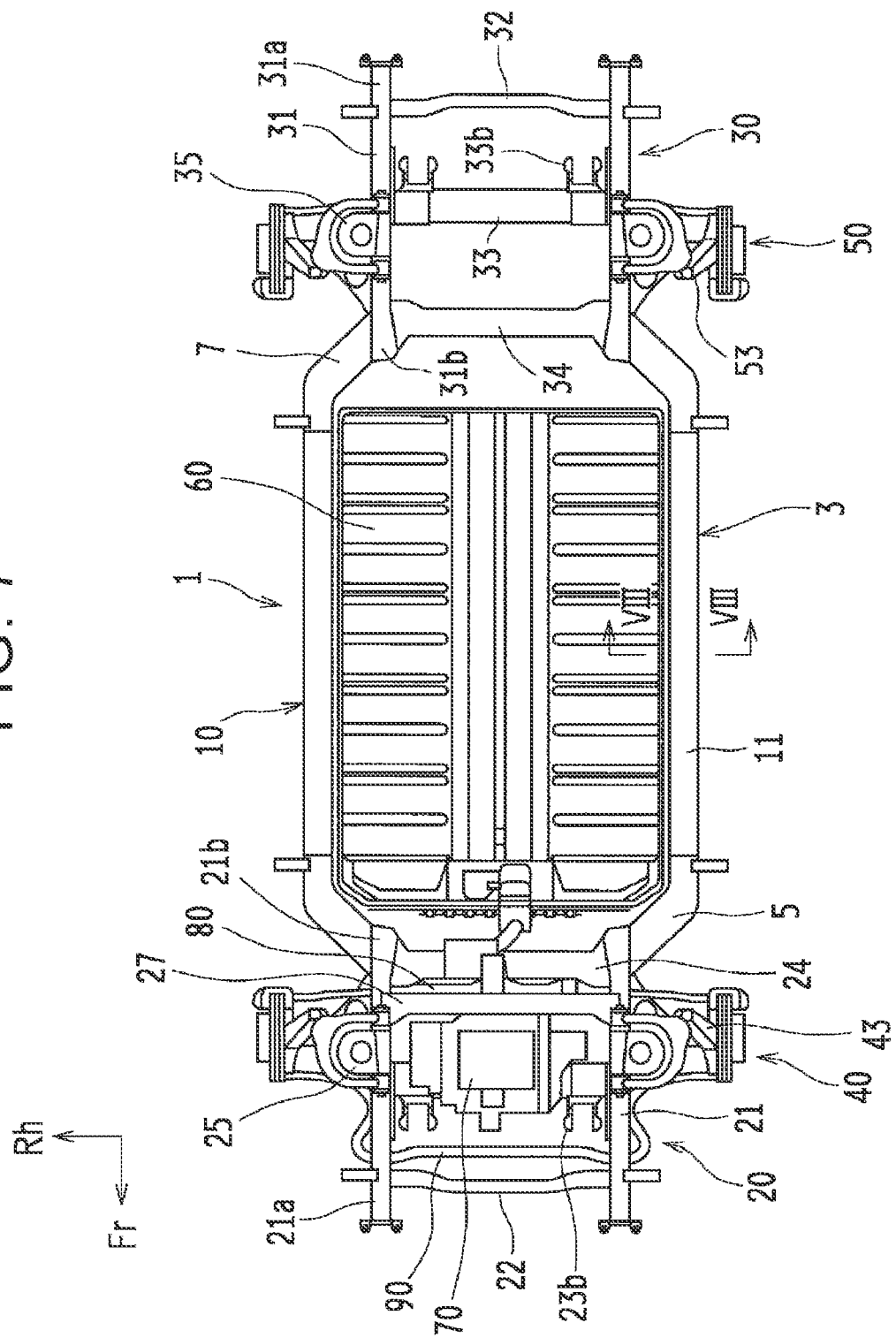
FIG. 7 is a schematic plan view of a state in which on-board equipment is mounted n the frame.
Figure 8:
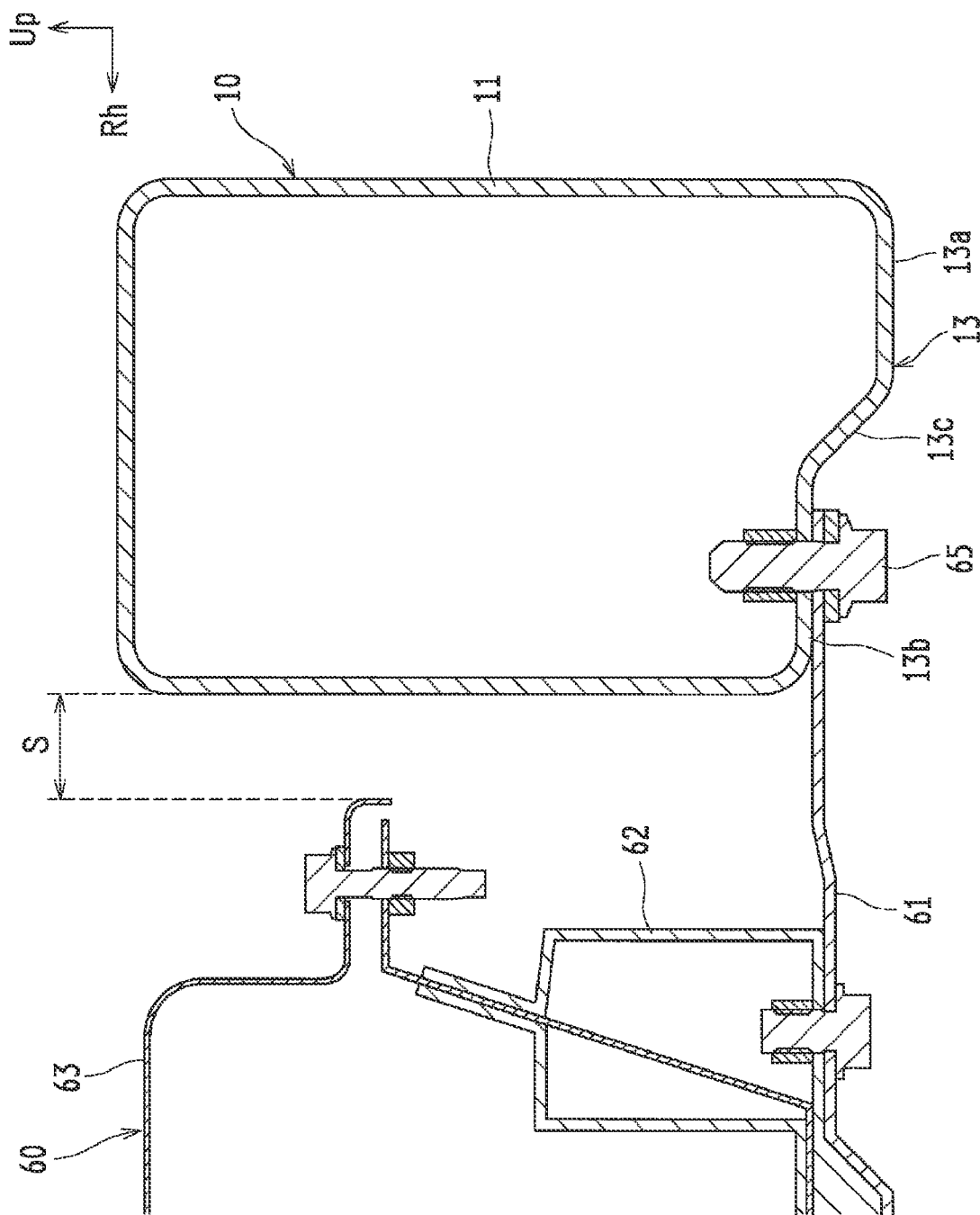
FIG. 8 is a sectional view taken along the arrows VIII-VIII shown in FIG. 7.

FIG. 7 is a schematic plan view of a state where on-board equipment is mounted on the frame 3, and FIG. 8 is a sectional view taken along the arrows VIII-VIII shown in FIG. 7. With the vehicle structure according to this embodiment, as shown in FIG. 7, the frame 3 supports not only the front suspensions 40 and the rear suspensions 50, but also on-board components such as the electric motor 70 serving as a driving source, a steering device 80, the battery 60, and so on.

As shown in FIG. 7, a fourth crossmember 27 extending in the vehicle width direction is stretched between portions of the front side rails 21 between the second front-side crossmember 23 and the third front-side crossmember 24. The electric motor 70 is supported by the frame 3 through the front-side motor mounts attached to the mount attaching portions 23*b*, respectively, and a rear-side motor mount (not shown) attached to the fourth crossmember 27. Thus, vibration of the electric motor 70 transmitted to the frame 3 is reduced.

A support bracket (not shown) extending in the vehicle front-rear direction is stretched between the second front-side crossmember 23 and the third front-side crossmember 24, and the steering device 80 is supported in a front portion of the frame vehicle 1 by the second front-side crossmember 23, the third front-side crossmember 24, and the support bracket.

The front suspension 40 and the rear suspension 50 are formed so as to have the same shape. However, since the steering device 80 is supported in the front portion of the frame vehicle 1, the front suspensions 40 support a steering wheel. Therefore, a stabilizer 90 that suppresses rolling is attached only to the front suspensions 40.

The battery 60 is the main electric power source that supplies electric power to the electric motor 70 and so on, and is a nickel hydrogen, or lithium ion secondary battery (not shown), or the like. As shown in FIG. 8, the battery 60 includes a battery panel 61, a battery pan 62, a battery lid 63, and so on. The battery panel 61 configures a bottom surface of the battery 60. The battery pan 62 configures a side surface and so on of the battery 60. The battery 60 is supported as the battery panel 61 is stretched between the side rails 11 in the vehicle width direction.

When the battery panel 61 is attached to a vehicle body member (for example, the frame 3) from below, it is necessary to have a given interval (see a space S in FIG. 8) between the vehicle body member and the battery 60 in order to avoid interference between the vehicle body member and the battery 60. Therefore, when, for example, brackets (not shown) projecting inward from the side rails 11 in the vehicle width direction, respectively, are provided, and the battery panel 61 is attached to the brackets, it is necessary to have given intervals between the brackets and the battery 60, respectively, in order to avoid interference between the brackets and the battery 60. Therefore, there is a problem that a space for installing the battery 60 is restricted corresponding to the projection of the brackets.

Hence, it is considered that the battery panel 61 is attached to the lower surfaces 13 of the side rails 11 directly without the brackets. Then, however, the battery panel 61 will be located lower than the lower ends of the side rails 11, and a problem may arise that it is difficult to protect the battery 60 from an obstacle and the like on a road surface.

Therefore, in this embodiment, as shown in FIG. 8, the battery panel 61 is attached to the inside portions 13*b* of the lower surfaces 13 of the side rails 11 in the vehicle width direction from below so that the battery panel 61 is stretched between the side rails 11 in the vehicle width direction. The inside portions 13*b* are formed so as to be one-step higher than the outside portions 13*a* of the lower surfaces 13 of the side rails 11 in the vehicle width direction through the steps 13*c*, respectively. Thus, the battery panel 61 is positioned higher than the outside portions 13*a* of the lower surfaces 13 of the side rails 11 in the vehicle width direction.

Here, the sentence "the battery panel 61 is higher than the outside portions 13*a* in the vehicle width direction" means not only that the bottom surface of the battery panel 61 is higher than the outside portions 13*a* in the vehicle width direction, but also that lower ends of bolts 65 are also higher than the outside portions 13*a* in the vehicle width direction. The bolts 65 are used to fasten the battery panel 61 to the inside portions 13*b* in the vehicle width direction, respectively. As described above, as the battery panel 61 including the bolts 65 is higher than the outside portions 13*a* in the vehicle width direction, the outside portions 13*a* of the lower surfaces 13 of the side rails 11 in the vehicle width direction are maintained at the lowest point among the frame 3 and the on-board components even when the battery panel 61 is attached to the lower surfaces 13 of the side rails 11.

Moreover, because the battery panel 61 is attached to the inside portions 13*b* of the lower surfaces 13 of the side rails 11 in the vehicle width direction directly without the brackets, it is only necessary to have the given spaces S between the side rails 11 and the battery 60, respectively, when the battery panel 61 is attached to the side rails 11.

Effects

As described above, with the vehicle structure of the frame vehicle 1 according to this embodiment, the front suspension 40 and the rear suspension 50 have the same shape, and at least the portion of the front-side frame portion 20, the portion supporting the front suspension 40 (the suspension tower 25 and the lower arm attaching portions 23a, 24a), and the portion of the rear-side frame portion 30, the portion supporting the rear suspension 50 (the suspension tower 35 and the lower arm attaching portions 33a, 34a), are symmetrical to each other in the front-rear direction with respect to the central frame portion 10. Therefore, it is possible to realize commonization of components, and it is thus possible to suppress an increase in the number of the components. Further, the mounting structure for the front suspension 40 and the mounting structure for the rear suspension 50 may be the same structure. Thus, it is also possible to suppress an increase in manufacturing and assembly cost.

Moreover, the central frame portion 10 is formed so as to be symmetrical in the front-rear direction, and the connecting portions of the front-side frame portion 20 to the central frame portion 10 (the rear end portions 21b of the front side rails 21), and connecting portions of the rear-side frame portion 30 to the central frame portion 10 (the front end portions 31b of the rear side rails 31) are symmetrical to each other in the front-rear direction with respect to the central frame portion 10. Therefore, connecting structures of the front-side and rear-side frame portions 20, 30 to the central frame portion 10 may be the same structure. As a result, it is also possible to suppress an increase in the manufacturing and assembly cost.

Furthermore, the central frame portion 10 is symmetrical in the front-rear direction, and the first section SC1 and the second section SC2 are symmetrical to each other in the front-rear direction with respect to the central frame portion 10. Also, the front suspension 40 and the rear suspension 50 are symmetrical to each other in the front-rear direction with respect to the central frame portion 10. Therefore, for example, it is possible to realize the frame vehicle that is able to travel forward and backward in the same mode regardless of the frontward and rearward directions. For example, it is possible to realize an automatic driving vehicle that has no concept of a driver's seat, and is able to travel forward and backward in the same mode.

Further, the lower ends of the side rails 11 having relatively high rigidity in the vehicle body member (the outside portions 13a of the lower surfaces 13 of the side rails 11 in the vehicle width direction) are located at the lowest point of the frame 3. The lower ends of the side rails 11 are set at positions lower than the on-board components such as the battery 60, the front suspension 40, the rear suspension 50, and the electric motor 70. Thus, it is possible to protect the on-board components from an obstacle and the like on a road surface.

Further, since the battery panel 61 is attached to the inside portions 13b of the lower surfaces 13 of the side rails 11 in the vehicle width direction without the brackets and so on, it is possible to suppress restriction of an installation space for the battery 60.

Moreover, the battery panel 61 that configures the bottom surface of the battery 60 is attached to the inside portions 13b of the lower surfaces 13 of the side rails 11 in the vehicle width direction from below so that the battery panel 61 is higher than the outside portions 13a of the lower surfaces 13 of the side rails 11 in the vehicle width direction. Therefore, the lower ends of the side rails 11 are maintained at positions lower than the battery panel 61. Thus, it is possible to protect the battery 60 from an obstacle and the like on a road surface.

Further, the rear end portions 21b of the front side rails 21 and the front end portions 11a of the side rails 11 are connected to each other by the front-side joint members 5, respectively, at the shortest distance and smoothly, the front-side joint members 5 extending obliquely. As a result, an impact load input to the front-side frame portion 20 is transmitted smoothly to the side rails 11 through the front side rails 21 and the front-side joint members 5, respectively. Thus, it is possible to ensure strength reliability performance and collision performance at the time of a front collision and the like.

Similarly, the front end portions 31b of the rear side rails 31 and the rear end portions 11b of the side rails 11 are connected to each other at the shortest distance and smoothly by the rear-side joint members 7, respectively, the rear-side joint members 7 extending obliquely. As a result, an impact load input to the rear-side frame portion 30 is transmitted smoothly to the side rails 11 through the rear side rails 31 and the rear-side joint members 7, respectively. Thus, it is possible to ensure strength reliability performance and collision performance at the time of a rear collision and the like.

Further, the central frame portion 10 is symmetrical in the front-rear direction, and at least the first section SC1 and the second section SC2 are symmetrical to each other in the front-rear direction with respect to the central frame portion 10. Therefore, the front-side joint members 5 and the rear-side joint members 7 that connect the central frame portion 10 to the first section SC1 and the second section SC2, respectively, are formed into the same shape and communized. Therefore, it is possible to further suppress an increase of the number of components.

Moreover, the front-side and rear-side joint members 5, 7 are formed separately from the side rails 11 and the front and rear side rails 21, 31. Therefore, as shown by a dashed-line arrow ST1 in FIG. 2, extension of the entire length of the frame vehicle 1 can be done flexibly as it is only necessary to extend the side rails 11 without any changes in the front-side and rear-side joint members 5, 7 that are formed separately from the side rails 11. Further, expansion of the interval between the side rails 11 as shown by a dashed-line arrow ST2 in FIG. 2, expansion of the intervals between the front side rails 21 and between the rear side rails 31 as shown by a dashed-line arrow ST3 in FIG. 2, lowering of a floor of the frame vehicle 1 (lowering of the side rails 11 with respect to the front and rear side rails 21, 31), and soon, are done flexibly because it is only necessary to change lengths, inclined angles, and so on of the front-side and rear-side joint members 5, 7, the front-side and rear-side joint members 5, 7 being formed separately from the side rails 11 and the front and rear side rails 21, 31.

Second Embodiment

In the first embodiment, the central frame portion 10 and the front-side and rear-side frame portions 20, 30 are connected to each other by the front-side and rear-side joint members 5, 7, respectively. A second embodiment is different from the first embodiment in that a central frame portion and front-side and rear-side frame portions are connected to each other through penetrating structures, respectively. Hereinafter, differences from the first embodiment are mainly described.

Frame

Figure 9:
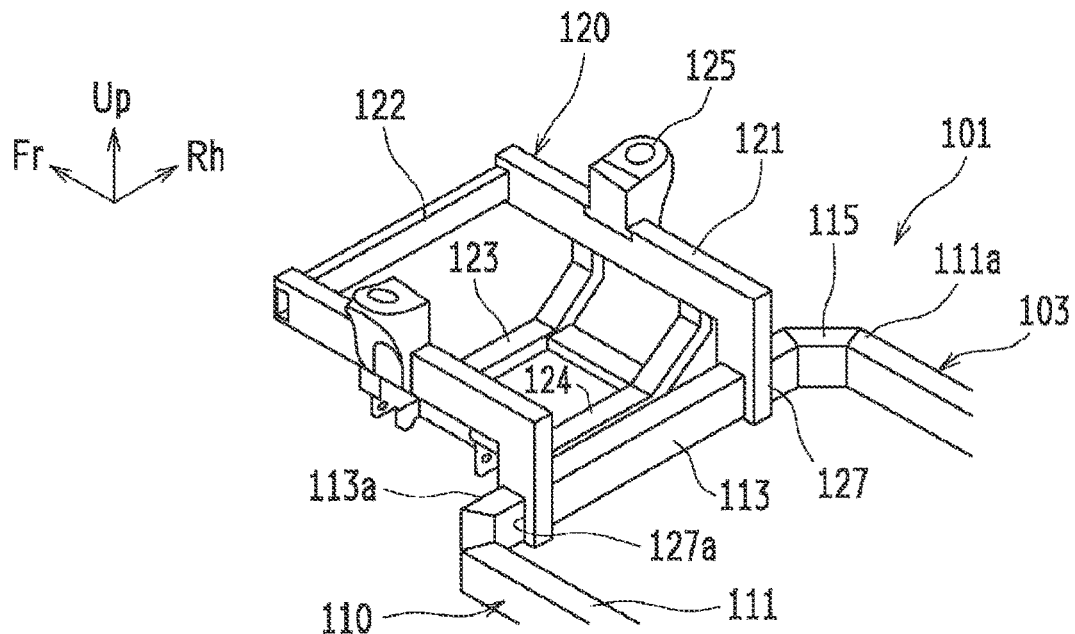
FIG. 9 is a schematic perspective view of a frame of a vehicle provided with a vehicle structure according to a second embodiment.
Figure 10:
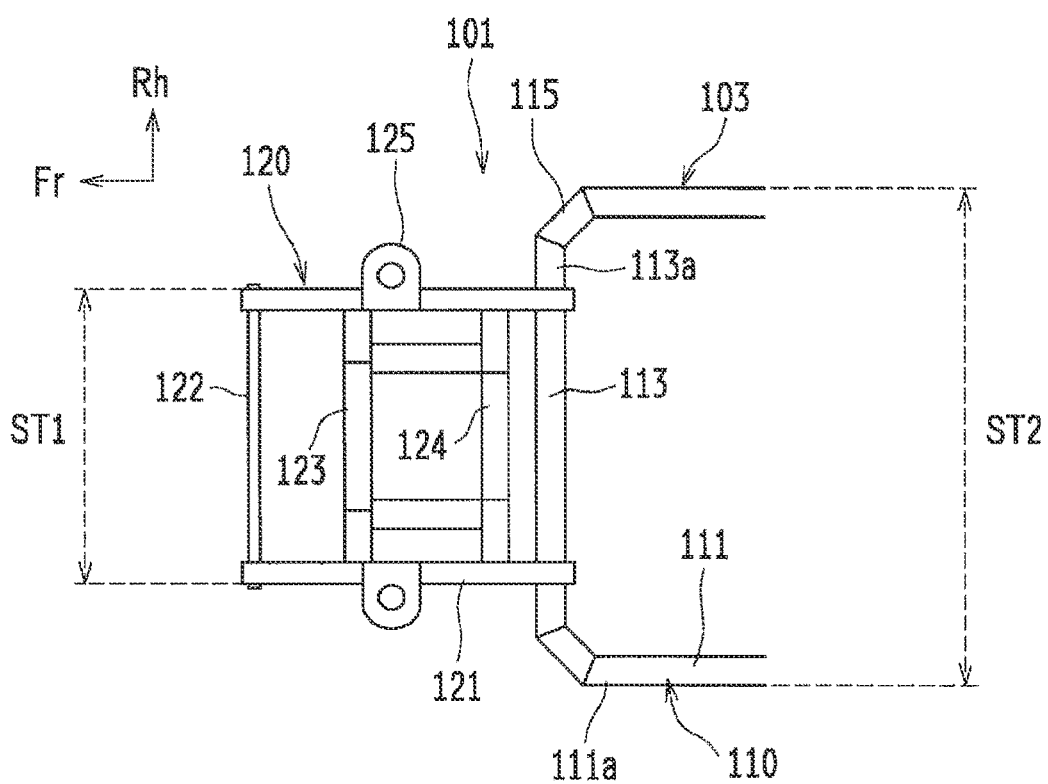
FIG. 10 is a schematic plan view of the frame.

FIG. 9 is a schematic perspective view of a frame 103 of a vehicle 101 (a frame vehicle 101) provided with a vehicle structure according to this embodiment, and FIG. 10 is a plan view of the frame 103. Similarly to the first embodiment, the frame 103 in this embodiment is also formed so as to be symmetrical in the front-rear direction. Therefore, a rear-side frame portion is not shown.

Central Frame Portion

As shown in FIG. 9 and FIG. 10, the central frame portion 110 includes a pair of side rails 111, a front-side crossmember 113, and a rear-side crossmember (not shown). The side rails 111 extend in the vehicle front-rear direction in both end portions of the central frame portion 110 in the vehicle width direction, respectively. The front-side crossmember 113 extends in the vehicle width direction and connects front end portions of the side rails 111 to each other. The rear-side crossmember (not shown) extends in the vehicle width direction and connects rear end portions of the side rails 111 to each other. The central frame portion 110 is formed so as to be symmetrical in the front-rear direction.

Each of the side rails 111, the front-side crossmember 113, and the rear-side crossmember is formed so as to have a closed section with an almost rectangular shape. Front end portions 111a of the side rails 111 and both end portions 113a of the front-side crossmember 113 in the vehicle width direction are connected to each other through the corner portions 115, respectively, by welding. Each of the corner portions 115 is formed so as to have a closed section with an almost rectangular shape. Rear end portions of the side rails 111 and both end portions of the rear-side crossmember in the vehicle width direction are connected to each other through corner portions, respectively. Each of the corner portions has the same shape as the corner portion 115.

Front-Side Frame Portion

A front-side frame portion 120 is connected to the front-side crossmember 113 of the central frame portion 110 and configured so as to support the front suspension 40. To be more specific, as shown in FIG. 9 and FIG. 10, the front-side frame portion 120 includes a pair of front side rails 121, post portions 127, and first to third front-side crossmembers 122, 123, 124. The front side rails 121 extend in the vehicle front-rear direction in both end portions of the front-side frame portion 120 in the vehicle width direction, respectively. The post portions 127 are formed integrally with the front side rails 121, respectively, and extend downward from rear end portions of the front side rails 121, respectively. The first to third front-side crossmembers 122, 123, 124 connect the front side rails 121 to each other in the vehicle width direction. In a plan view, the front-side frame portion 120 is formed so as to have a ladder shape.

The front side rails 121 extend in the vehicle front-rear direction at positions higher than the side rails 111 of the central frame portion 110, respectively, and also on inner sides with respect to the side rails 111 in the vehicle width direction, respectively. Suspension towers 125 for attaching the front suspensions 40, respectively, are provided in positions in the front side rails 121 near the second front-side crossmember 123, respectively.

It has been common that a conventional frame vehicle has a configuration in which a front-side frame portion and a central frame portion are connected to each other as lower ends of post portions are welded to an upper surface of a front-side crossmember. Therefore, only a length equivalent to the circumference of the post portion is ensured as a welding length of fillet welding.

Therefore, in this embodiment, as shown in FIG. 9 and FIG. 10, the front-side crossmember 113 is allowed to pass through rear end portions of the front-side frame portion 120 in the vehicle width direction so that the front-side frame portion 120 and the central frame portion 110 are connected to each other.

To be more specific, through holes 127a are formed in lower end portions of the post portions 127 extending downward from the rear end portions of the front side rails 121, respectively. The through-holes 127a pass through the post portions 127 in the vehicle width direction, respectively, and have an almost rectangular shaped section. As a result, the front-side frame portion 120 and the central frame portion 110 are connected to each other as the front-side crossmember 113 is inserted into the through-holes 127a of the post portions 127, and an outer peripheral portion of the front-side crossmember 113 and edge portions of the through-holes 127a are fillet-welded to each other on the inner side and the outer side in the vehicle width direction. As a result, it is possible to ensure a length twice (on the inner side and the outer side of) the circumference of the front-side crossmember 113 as a welding length of the fillet welding.

Rear-Side Frame Portion

The rear-side frame portion and the central frame portion 110 are also connected to each other as the rear-side crossmember passes through front end portions of the rear-side frame portion in the vehicle width direction.

Effects

With the vehicle structure of the frame vehicle 101 according to this embodiment, the penetrating structures are used. Therefore, it is possible to easily change a relative positional relation among the central frame portion 110, the front-side frame portion 120, and the rear-side frame portion in the vehicle width direction. Therefore, it is possible to easily expand widths of the front-side frame portion 120 and the rear-side frame portion with respect to the common central frame portion 110 as shown by a dashed-line arrow ST1 in FIG. 10. Further, as shown by a dashed-line arrow ST2 in FIG. 10, it is possible to easily expand a width of the central frame portion 110 with respect to the common front-side frame portion 120 and the rear-side frame portion.

Moreover, since it is possible to ensure the length that is twice the circumference of the front-side crossmember 113 as the welding length of the fillet welding, it is possible to strongly connect the central frame portion 110, the front-side frame portion 120, and the rear-side frame portion to each other.

Other Embodiments

The disclosure is not limited to the above embodiments, and is carried out in various other forms without departing from the spirit or main characteristics of the disclosure.

In the foregoing embodiment, the front-side frame portion 20 and the rear-side frame portion 30 are formed so as to be symmetrical to each other in the front-rear direction with respect to the central frame portion 10. However, since it is only necessary that at least the first section SC1 and the second section SC2 are symmetrical to each other in the front-rear direction with respect to the central frame portion 10, for example, the front-side frame portion 20 and the rear-side frame portion 30 may be formed into the same shape, and then a portion of the front-side frame portion 20 in front of the first section SC1, or a portion of the rear-side frame portion 30 behind the second section SC2 may be cut. Thus, it is possible to easily realize a frame vehicle having the front-side frame portion 20 and the rear-side frame portion 30 that have different lengths from each other. As a result, it is possible to increase a degree of freedom of a layout of a vehicle.

Moreover, in the foregoing embodiments, the disclosure is applied to an electric vehicle. However, the disclosure is not limited to this, and may be applied to, for example, an engine vehicle and a hybrid vehicle.

Further, in the foregoing embodiment, the front-side frame portion 20 supports the electric motor 70. However, the disclosure is not limited to this, and the rear-side frame portion 30 may support the electric motor 70. In this case, since the mount attaching portions 33b are provide in the second rear-side crossmember 33, the fourth crossmember 27 may be simply stretched between the rear side rails 31 instead of the front side rails 21. As a result, the rear-side frame portion 30 is able to elastically support the electric motor 70.

As described so far, the foregoing embodiments are examples only in every aspect, and should not limit the interpretation of the disclosure. Further, all deformations and changes that belong to the scope of claims and its equivalent scope are within the scope of the disclosure.

With the disclosure, it is possible to realize a vehicle structure that is able to suppress an increase in the number of components and an increase in manufacturing and assembly cost. Therefore, the disclosure is extremely beneficial when it is applied to a vehicle structure of a frame vehicle.

What is claimed is:

1. A vehicle structure of a frame vehicle in which a body is mounted on a frame through a mount, the vehicle structure comprising:
   a central frame portion that is provided in a center portion of the vehicle structure in a vehicle front-rear direction and formed so as to be symmetrical in the front-rear direction;
   a front-side frame portion that is connected to a front end portion of the central frame portion and supports a front suspension; and
   a rear-side frame portion that is connected to a rear end portion of the central frame portion and supports a rear suspension, wherein:
   the central frame portion, the front-side frame portion, and the rear-side frame portion are provided as the frame;
   at least a section of the front-side frame portion from a connecting portion of the front-side frame portion to the central frame portion through a portion supporting the front suspension, and a section of the rear-side frame portion from a connecting portion of the rear-side frame portion to the central frame portion through a portion supporting the rear suspension are formed so as to be symmetrical to each other in the front-rear direction with respect to the central frame portion; and
   the front suspension and the rear suspension have the same shape and are attached to the front-side frame portion and the rear-side frame portion, respectively, so as to be symmetrical to each other in the front-rear direction with respect to the central frame portion, wherein:
   the central frame portion includes a pair of side rails and supports a battery, the side rails extending in the vehicle front-rear direction in both end portions of the central frame portion in a vehicle width direction, respectively; and
   lower ends of the side rails are set at positions lower than on-board components including the battery and both of the front suspension and the rear suspension.

2. The vehicle structure according to claim 1, wherein:
   the battery is supported as a battery panel that configures a bottom surface of the battery is stretched between the side rails in the vehicle width direction;
   inside portions of lower surfaces of the side rails in the vehicle width direction are formed so as to be one-step higher than outside portions of the lower surfaces of the side rails in the vehicle width direction through step portions, respectively; and
   the battery panel is attached to the inside portions of the lower surfaces of the side rails in the vehicle width direction from below so that the battery panel is higher than the outside portions of the lower surfaces of the side rails in the vehicle width direction.

3. A vehicle structure of a frame vehicle in which a body is mounted on a frame through a mount, the vehicle structure comprising:
   a central frame portion that is provided in a center portion of the vehicle structure in a vehicle front-rear direction and formed so as to be symmetrical in the front-rear direction;
   a front-side frame portion that is connected to a front end portion of the central frame portion and supports a front suspension; and
   a rear-side frame portion that is connected to a rear end portion of the central frame portion and supports a rear suspension, wherein:
   the central frame portion, the front-side frame portion, and the rear-side frame portion are provided as the frame;
   at least a section of the front-side frame portion from a connecting portion of the front-side frame portion to the central frame portion through a portion supporting the front suspension, and a section of the rear-side frame portion from a connecting portion of the rear-side frame portion to the central frame portion through a portion supporting the rear suspension are formed so as to be symmetrical to each other in the front-rear direction with respect to the central frame portion; and
   the front suspension and the rear suspension have the same shape and are attached to the front-side frame portion and the rear-side frame portion, respectively, so as to be symmetrical to each other in the front-rear direction with respect to the central frame portion, wherein:
   the central frame portion includes a pair of side rails, the side rails extending in the vehicle front-rear direction in both end portions of the central frame portion in the vehicle width direction, respectively, while the front-side frame portion and the rear-side frame portion include a pair of front side rails and a pair of rear side rails, respectively, the front side rails and the rear side rails extending in the vehicle front-rear direction at positions higher than the side rails, respectively, and on inner sides with respect to the side rails in the vehicle width direction, respectively;
   the vehicle structure comprising:
   front-side joint members that are connected to rear end portions of the front side rails, respectively, extend from the rear end portions of the front side rails, respectively, to a rear side in the vehicle front-rear direction so as to be inclined outward in the vehicle width direction and downward, and then are connected to front end portions of the side rails, respectively, the front-side joint members being formed separately from the central frame portion and the front-side and rear-side frame portions; and rear-side joint members that are connected to front end portions of the rear side rails, respectively, extend from the front end portions of the rear side rails, respectively, to a front side in the vehicle front-rear direction so as to be inclined outward in the vehicle width direction and downward, and then are connected to rear end portions of the side rails, respectively, the rear-side joint members being formed separately from the central frame portion and the front-side and rear-side frame portions; and the front-side joint member and the rear-side joint member are formed so as to have the same shape.

4. A vehicle structure of a frame vehicle in which a body is mounted on a frame through a mount, the vehicle structure comprising:

a central frame portion that is provided in a center portion of the vehicle structure in a vehicle front-rear direction and formed so as to be symmetrical in the front-rear direction;

a front-side frame portion that is connected to a front end portion of the central frame portion and supports a front suspension; and a rear-side frame portion that is connected to a rear end portion of the central frame portion and supports a rear suspension, wherein:

the central frame portion, the front-side frame portion, and the rear-side frame portion are provided as the frame;

at least a section of the front-side frame portion from a connecting portion of the front-side frame portion to the central frame portion through a portion supporting the front suspension, and a section of the rear-side frame portion from a connecting portion of the rear-side frame portion to the central frame portion through a portion supporting the rear suspension are formed so as to be symmetrical to each other in the front-rear direction with respect to the central frame portion; and the front suspension and the rear suspension have the same shape and are attached to the front-side frame portion and the rear-side frame portion, respectively, so as to be symmetrical to each other in the front-rear direction with respect to the central frame portion, wherein:

the central frame portion includes a pair of side rails, the side rails extending in the vehicle front-rear direction in both end portions of the central frame portion in the vehicle width direction, respectively, and front-side and rear-side crossmembers that extend in the vehicle width direction, the front-side crossmember connecting front end portions of the side rails to each other, and the rear-side crossmember connecting rear end portions of the side rails to each other; and the front-side crossmember passes through rear end portions of the front-side frame portion in the vehicle width direction, while the rear-side crossmember passes through front end portions of the rear-side frame portion in the vehicle width direction.

\* \* \* \* \*